F. R. HAWS.
WINDOW ATTACHMENT.
APPLICATION FILED OCT. 15, 1918.
1,304,479.
Patented May 20, 1919.
2 SHEETS—SHEET 1.
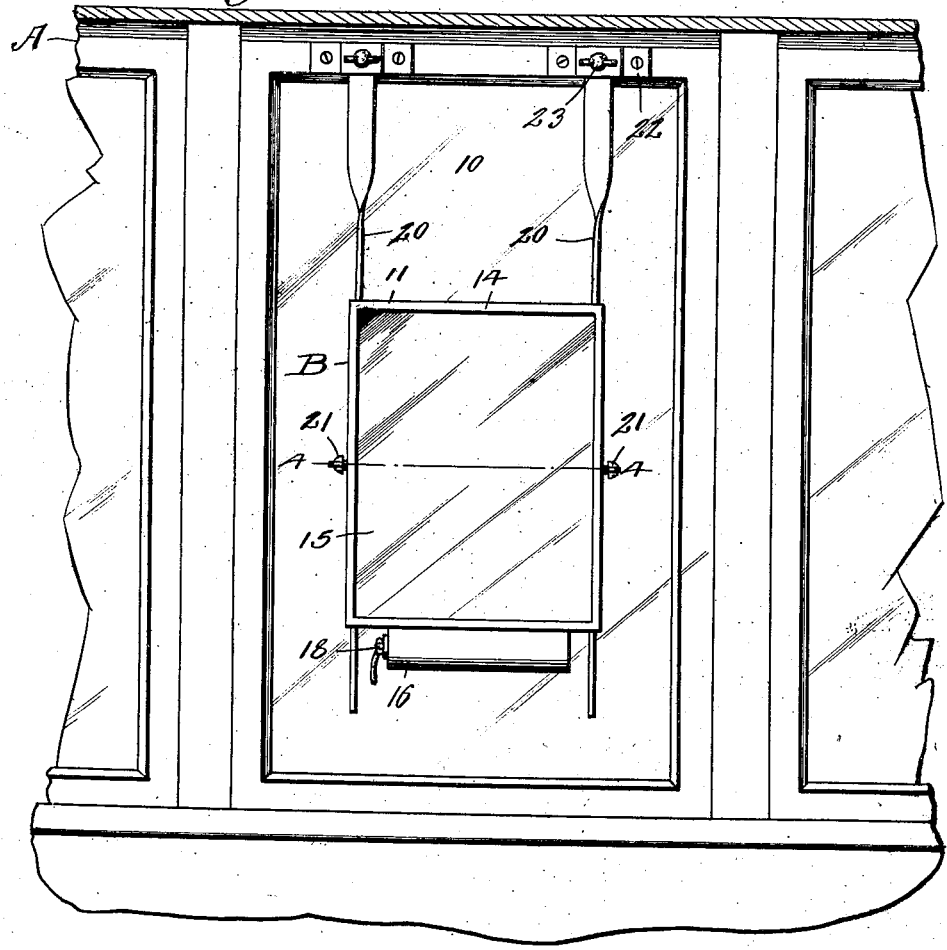
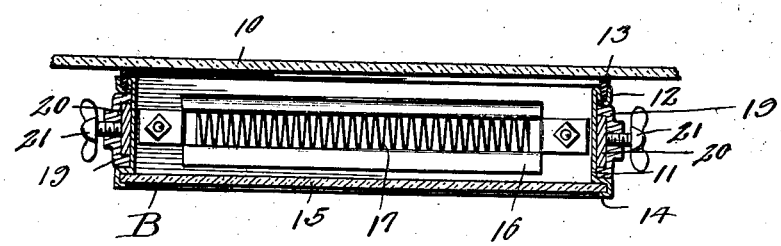
Witnesses
Inventor
F. R. Haws,
By Victor J. Evans
Attorney

F. R. HAWS.
WINDOW ATTACHMENT.
APPLICATION FILED OCT. 15, 1918.

1,304,479.

Patented May 20, 1919.
2 SHEETS—SHEET 2.

Witnesses

Inventor
F. R. Haws,
By Victor J. Evans
Attorney

UNITED STATES PATENT OFFICE.

FRANK R. HAWS, OF MONMOUTH, ILLINOIS.

WINDOW ATTACHMENT.

1,304,479.  Specification of Letters Patent.  Patented May 20, 1919.

Application filed October 15, 1918. Serial No. 258,161.

*To all whom it may concern:*

Be it known that I, FRANK R. HAWS, a citizen of the United States, residing at Monmouth, in the county of Warren and State of Illinois, have invented new and useful Improvements in Window Attachments, of which the following is a specification.

This invention relates to an attachment for windows which when applied thereto may be employed to heat the pane in the window to prevent moisture from accumulating thereon.

An object of the invention is to provide a simple and durable attachment of this character which may be advantageously employed for the purpose stated above in connection with the windows in the front of motor vehicles and includes a frame of novel construction which is intended to be slidably connected with a window frame.

With these and other objects in view the invention resides in the novel combination and arrangement of parts which will be hereinafter described and claimed.

The preferred embodiment of the invention has been illustrated in the accompanying drawing, although no restriction is necessarily made to the precise details of construction therein shown, as changes, alterations and modifications within the scope of the claim may be resorted to if desired.

In the drawing:

Figure 1 is a view in side elevation of a portion of a motor vehicle to a window in which is shown applied an attachment constructed in accordance with the invention.

Fig. 4 is a cross section on the line 4—4 of Fig. 1.

Like characters of reference denote the corresponding parts throughout the various views in the drawings.

Figure 2:
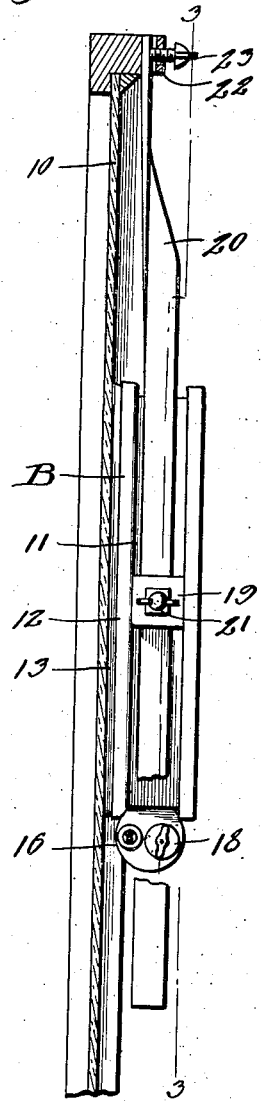
Fig. 2 is a view in side elevation of Fig. 1.
Figure 3:
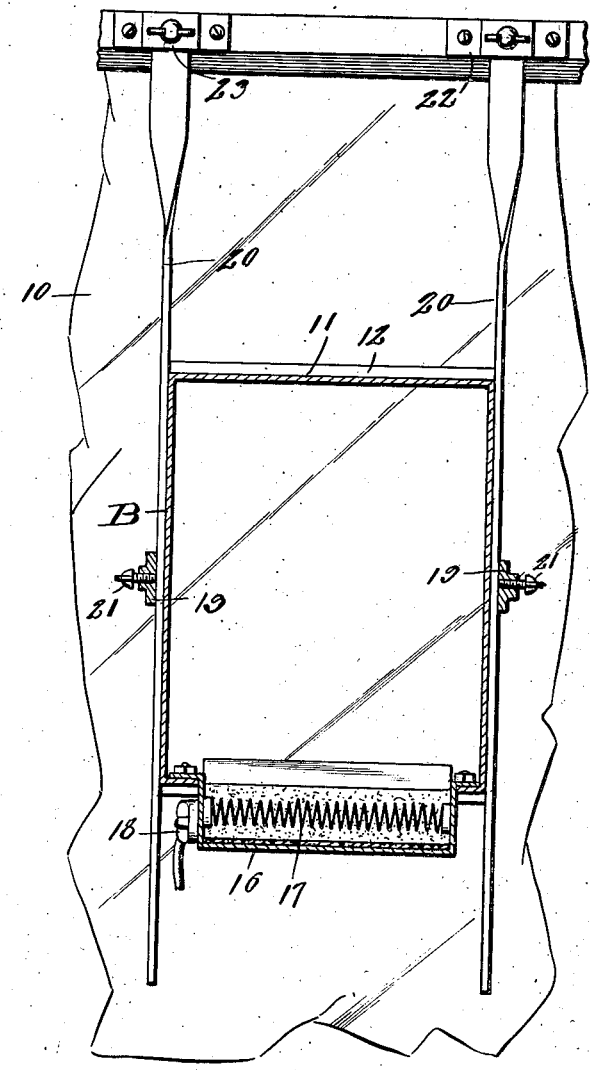
Fig. 3 is a vertical longitudinal section through Fig. 1.

Referring now to the drawing in detail the letter A designates a portion of a motor vehicle and which in this instance has been shown as a trolley car wherein the front platform is provided with a window 10. Adjustably connected with the frame of the window 10 is an attachment B constructed in accordance with the invention and including a rectangular shaped frame 11. The frame 11 is adapted to rest against the glass in the window 10 and is of rectangular shape and formed from any material suitable for the purpose although it is preferable that the frame 11 be constructed of sheet metal. The material from which the frame 11 is formed is bent to provide the frame at one side with a continuous bead 12 which is employed to hold a cushion 13 for contact with the glass in the window 10. The other side of the frame is provided with a flange 14 to hold the glass 15 in place, said glass forming the outer face of the device.

Detachably connected with the lower rail of the frame 11 below an opening therein, is a housing 16 which has extending longitudinally thereof an electrically operated device 17. The heating device 17 may be arranged in the electrical circuit which operates the heater in the motor vehicle and may be controlled through the operation of a switch 18 with which the housing 17 is provided.

Fixed to the opposite sides of the frame 11 intermediate the top and bottom thereof are loops 19 through which are passed rods 20. The loops 19 are provided with thumb screws 21 which are employed to maintain the frame 11 in adjusted position upon the rods 20.

The rods 20 are passed through offset portions in brackets 22 secured to the top rail of the window 10 and are held in engagement with the said rail of the window by thumb screws 23 which permit the adjustment of the attachment upon the window A and also allow the frame 11 to be moved vertically toward either end of the window.

When the attachment is applied to the window in a motor vehicle as shown in Fig. 1 in the drawing it will be apparent that when the heating device 17 is in operation the air within the compartment formed by the frame 17 and glass in the window 10, will be warmed to such an extent as to prevent the accumulation of condensed moisture upon the glass in the window 10, while through the connection of the rods 20 with the window 10 and the mounting of the frame 11 upon the rods the attachment may be moved longitudinally of the window to which it is applied.

From the foregoing description taken in connection with the accompanying drawing it is apparent that a window attachment has been provided which though comparatively inexpensive in manufacture is highly efficient for the purpose stated.

Having thus described the invention what is claimed as new is:

The combination with a window, of a frame, a bead upon one side of said frame, cushioning means within said bead contacting with the glass in said window, a flange at the opposite side of said frame, a glass engaged by said flange, a pair of spaced rods on which said frame is mounted to slide which rods lie between said bead and flange, and brackets on the upper rail of said window with which said rods are slidably connected.

In testimony whereof I affix my signature.

FRANK R. HAWS.